June 21, 1949.  R. CRAIN  2,473,788
GRAIN THRESHING AND SEPARATING MACHINE
Filed May 3, 1946  4 Sheets-Sheet 1
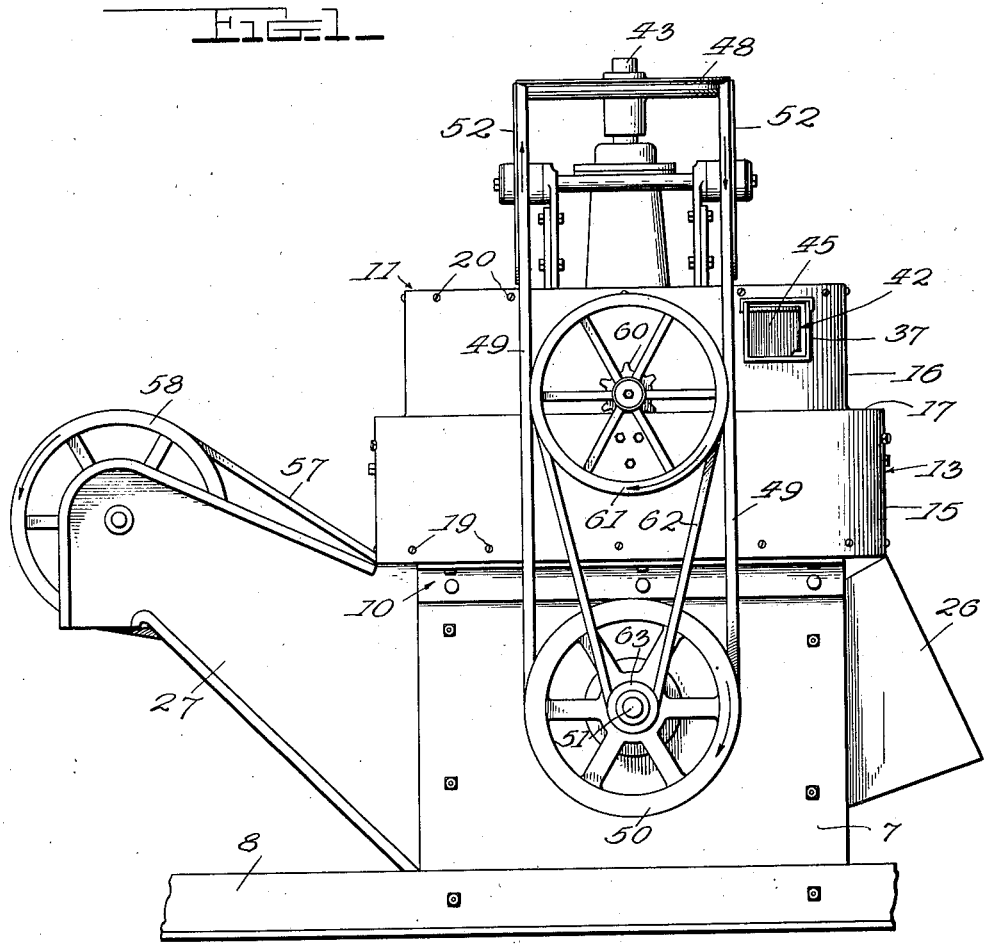
Inventor
Rollie Crain
By H. B. Evilleson & Co. Attorney

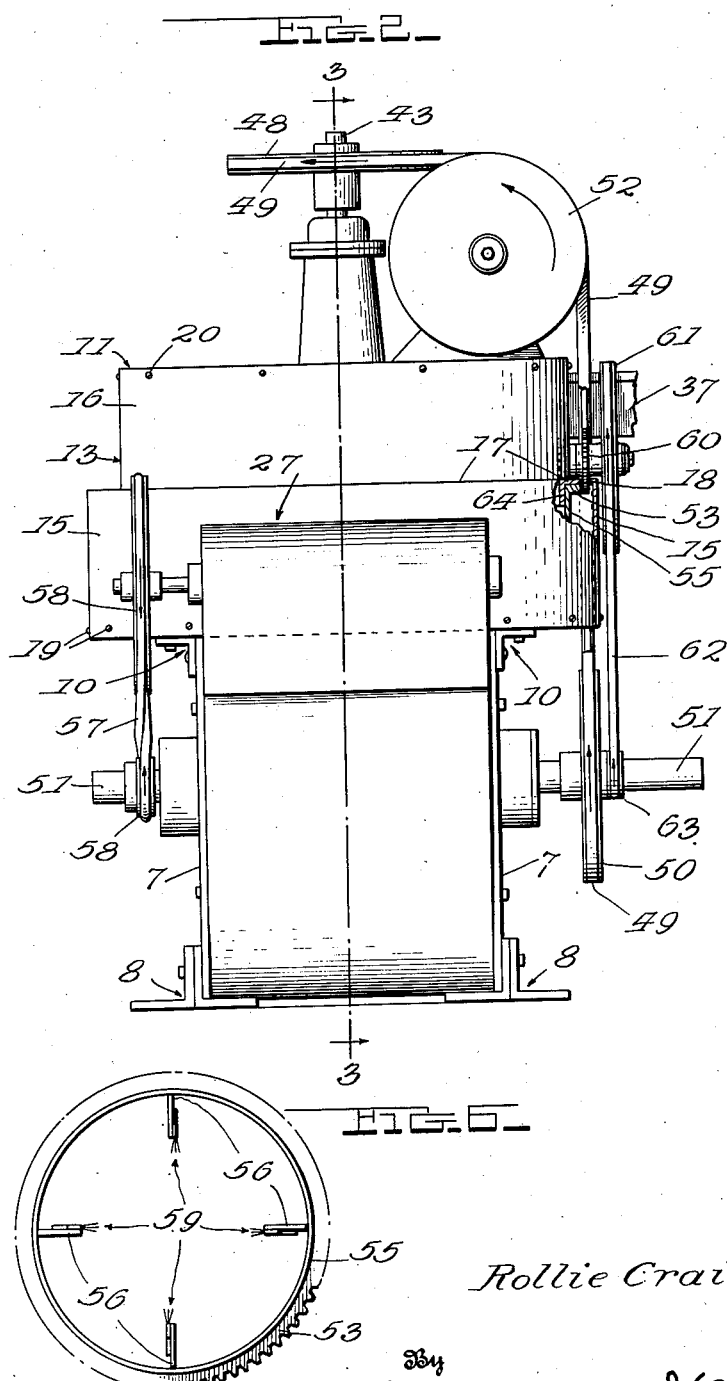

June 21, 1949.    R. CRAIN    2,473,788
GRAIN THRESHING AND SEPARATING MACHINE
Filed May 3, 1946    4 Sheets-Sheet 3
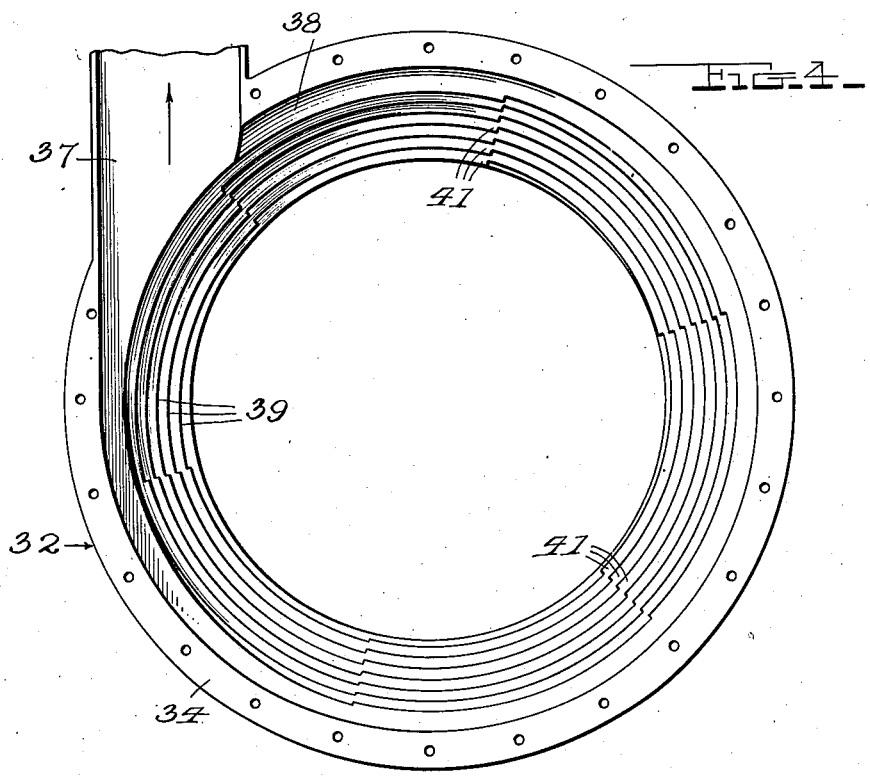
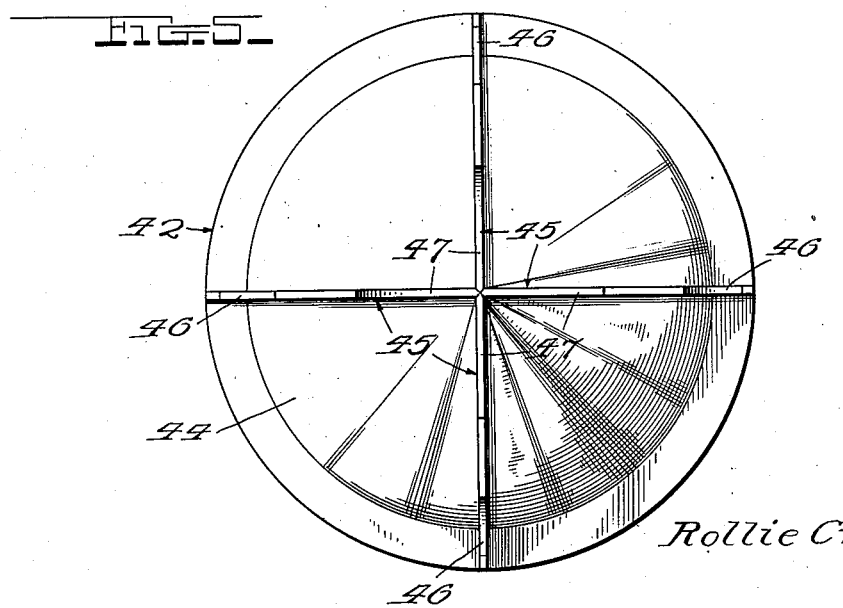
Inventor
Rollie Crain
By H. B. Willson & Co. Attorney June 21, 1949.　　　　　R. CRAIN　　　　　2,473,788
GRAIN THRESHING AND SEPARATING MACHINE
Filed May 3, 1946　　　　　　　　　　　　4 Sheets-Sheet 4

Rollie Crain　Inventor
By H. B. Willson & Co. Attorney

Patented June 21, 1949

2,473,788

UNITED STATES PATENT OFFICE 2,473,788

GRAIN THRESHING AND SEPARATING MACHINE

Rollie Crain, Marion, Ill.

Application May 3, 1946, Serial No. 667,028

8 Claims. (Cl. 130—27)

The invention aims to provide an unusually simple, compact and efficient machine for threshing various kinds of grain and separating the threshed grain from the straw, and in carrying out this end, further objects are to provide an improved machine which will require less attention, which may be easily changed to attain different speed ratios between essential rotating elements for threshing different kinds of grain, will possess greater durability, will possess sturdy and durable qualities with a minimum of weight, will be readily adaptable for use as a small unit in a combine, will utilize both centrifugal force and gravity for separation, will conform with practical engineering requirements, will meet necessary manufacturing requirements where quantity and quality, at minimum cost, are essential factors, etc.

Figure 1 of the accompanying drawings is a side elevation of the machine.

Fig. 2 is a side elevation from a viewpoint to the left of Fig. 1, partly broken away and in section.

Fig. 4 is an upper end view of the helically grooved and perforated inner wall within the confines of which the straw and threshed grain therein are centrifugally whirled.

Fig. 5 is a lower end view of the rotary straw-whirler-and-blower.

Fig. 6 is a lower end view of the rotary scraper and brush which moves the grain to the grain outlet and cleans the perforations of the aforesaid inner wall.

Figure 3:
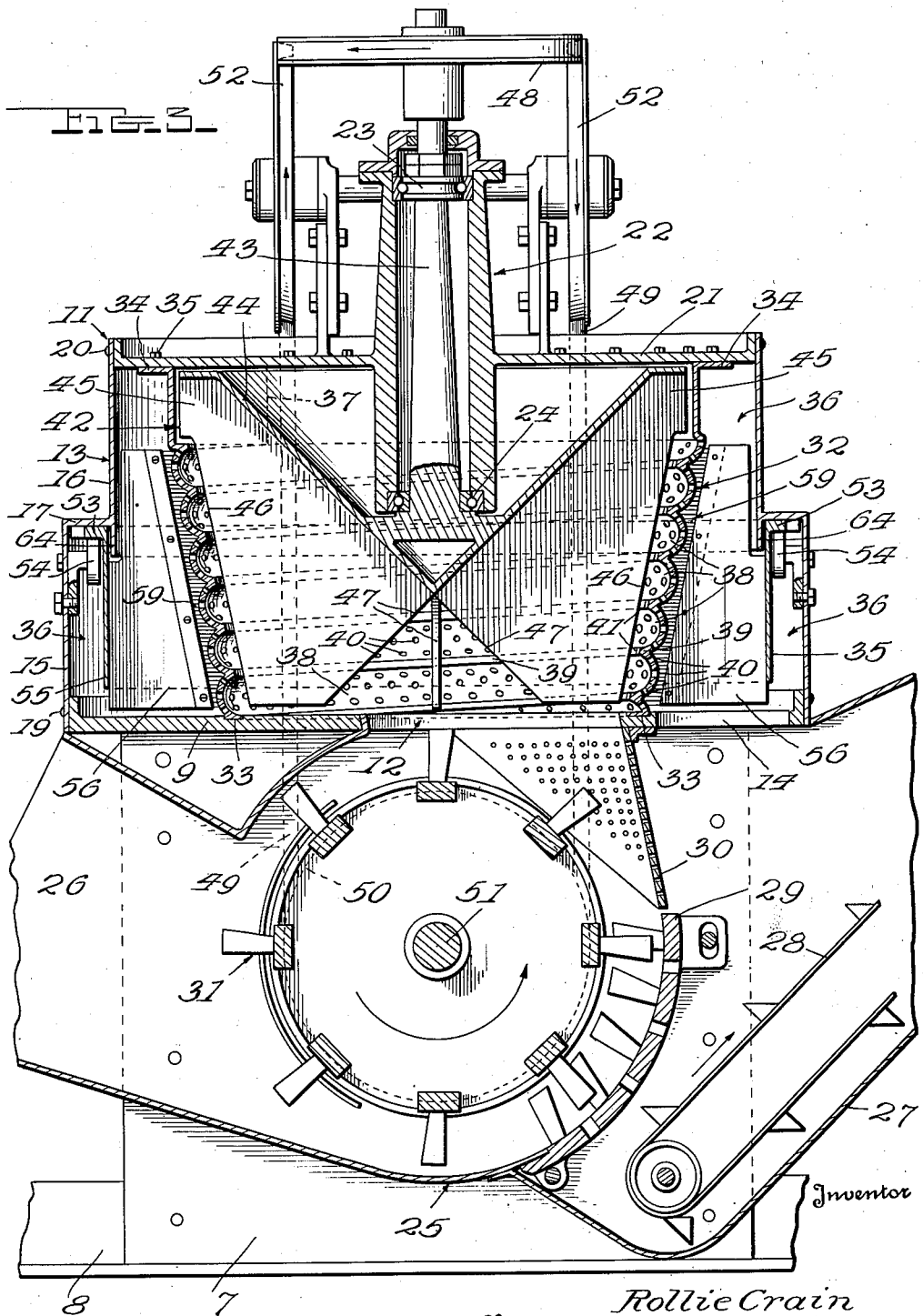
Fig. 3 is a vertical sectional view on line 3—3 of Fig. 2.

Preferred features of construction have been shown in the drawings and while they will be rather specifically described, it is to be understood that variations may be made, within the scope of the invention as claimed.

Two parallel side plates 7 are secured to and rise rigidly from suitable base angles or the like 8, and a horizontal plate 9 is suitably secured at 10 upon the upper ends of said side plates 7, said plate 9 forming the bottom of a cylindrical casing 11, the axis of which is disposed vertically. The plate 9 is formed with an opening 12 spaced from the casing side wall 13 and constituting an inlet for straw, and any grain with which it may be laden, and said plate 9 is also formed with a grain outlet opening 14 between said opening 12 and side wall 13. This side wall 13 comprises a lower cylindrical section 15, an upper cylindrical section 16, and a horizontal step 17 joining said sections 15 and 16, said step having a slot 18 (Fig. 2). The section 15 is secured at 19 to the bottom 9, and the section 16 is secured at 20 to the casing top 21, said top being provided with a central tubular bearing mount 22 containing upper and lower bearings 23 and 24.

Secured between the side plates 7 is a casing 25, one end of which is formed with an entrance 26 for the grain to be threshed. The other end of the casing 25 is provided with a threshed grain outlet spout 27 containing a grain elevator 28. A suitable perforated concave 29 extends across the casing 25, and a perforated up-chute 30 is disposed at the delivery edge of said concave and extends substantially vertically therefrom to the edge of the opening 12 toward the grain outlet 27, said up-chute being secured to the plate 9. A suitable threshing cylinder 31 is mounted in the casing 25 and is cooperable with the concave 29 to thresh the grain from the heads, most of the grain being discharged into the grain outlet spout 27, and said cylinder throws the straw and any grain remaining therein upwardly through the opening 12 into the casing 11, wherein separation is effected. The grain separated from the straw in this casing descends through the grain outlet 14 as hereinafter explained, and this grain, together with that passing through the concave 29, is carried from the casing 25 by means of the elevator 28.

Within the casing 11 and concentric with its side wall 13, is a continuous inner wall 32 which surrounds the threshed-straw-and-grain-inlet 12 and extends between the latter and the grain outlet 14. The inner wall 32 extends from the bottom 9 to the top 21, is seated at its lower end in a groove 33 of said bottom, and is provided at its upper end with an outwardly projecting flange 34 which is secured at 35 to said top 21; and said wall 32 is spaced inwardly from the casing side wall 13 to provide a grain-receiving chamber 36. The wall 32 is gradually increased in diameter from its lower to its upper end and the latter is provided with a tangential straw outlet 37 which extends through the upper section 16 of the casing side wall 13. Internally, this wall 32 is formed with a helical groove 38, preferably of semi-circular cross section, and said wall is provided also with a relatively narrow helical rib 39, the convolutions of said helical rib 39 being disposed between the convolutions of said helical groove 38. Grain discharge perforations 40 are formed through the wall 32 and communicate with the groove 38, and straw-agitating cams 41 are formed on the inner edge of the rib 39. These cams are spirally pitched, and they repeatedly move the whirling straw inwardly and then suddenly release it for outward movement by centrifugal force, thereby causing radial pulsation of the straw to effect better release of the grain.

A straw-whirling-and-air-blowing-rotor 42 is located within the confines of the inner wall 32, the shaft 43 of said rotor 42 being mounted by means of the bearings 23 and 24 in the mount 22. This rotor 42 includes an inverted cone-shaped body 44 centrally secured to the lower end of the shaft 43 and having its upper end disposed adjacent the casing top 21 and in close proximity to the upper end of the wall 32; the lower end of said body being at an elevation above the bottom 9. Radial blades 45 are secured to the body 44, said blades extending outwardly into close relation with the wall 32 and projecting downwardly into close relation with the bottom 9. These blades 45 have steeply inclined outer edges 46 which span the groove 38, and inner edges 47 which diverge downwardly from the lower end of the body 44.

The upper end of the rotor shaft 43 is provided with a pulley 48 connected by a belt 49 with a pulley 50 on the shaft 51 of the cylinder 31, said belt extending over suitable idlers 52. The shaft 51 is the drive shaft of the entire machine. By using a pulley 50 of suitable size on this shaft and a pulley 48 of appropriate size on the rotor shaft 43, any desired speed ratio between the cylinder 31 and rotor 42 may be attained, according to the grain to be threshed and separated.

Directly under the step 17 of the casing side wall 13, is a horizontal ring gear 53 rotatably mounted on rollers 54. A sleeve 55 is secured to the inner edge of this ring gear and projects downwardly therefrom, and said sleeve is provided with a plurality of scraper blades 56 for scraping the grain which discharges through the perforations 40, from the bottom 9 to the grain outlet 14. The grain descends through this outlet to the elevator 28. This elevator 28 is driven by a crossed belt 57 and pulleys 58 from the drive shaft 51.

The inner edges of the scraper blades 56 are preferably provided with brushes 59 contacting with the wall 32 and aiding materially in keeping the perforations 40 clean.

For driving the scraper and brush unit (53, 55, 56, 59), a pinion 60 (Fig. 2) is suitably mounted over the step 17 of the casing side wall 13. The lower portion of this pinion extends through the slot 18 and meshes with the teeth of the ring gear 53. A pulley 61 is connected to the pinion 60 and engages a belt 62 driven by a pulley 63 on the drive shaft 51.

An annular guide flange 64 is preferably provided on the inner edge of the step 17, said flange fitting within the upper end of the sleeve 55.

*Operation*

The grain to be threshed is fed into the entrance 26, and the cylinder-and-concave-assembly operates to thresh the grain from the heads.

Most of this threshed grain passes through the concave 29 to be elevated by the elevator 28. The rest of the grain and the straw are thrown upwardly by the cylinder 31 and guided by the up-chute 30 through the opening 12 into the space within the confines of the inner wall 32, and any straw tending to rotate with the cylinder and pass the opening 12, is beaten against the edge of this opening opposite said up-chute and thus further threshed and separated from said cylinder. The grain-laden straw passed through the opening 12 is whirled by the rotor 42 and caused to ascend by the helical groove 38 and rib 39, and the straw is agitated by the cams 41. During the whirling and agitation of the straw, any grain therein is centrifugally delivered through the perforations 40 into the chamber 36 between the walls 13 and 32. Here the grain drops to the bottom 9 and is scraped by the blades 56 to the grain outlet 14, through which it descends to the elevator 28. The movement of the blades 56 causes the brushes 59 to constantly exert a cleaning action on the perforations 40. The straw and most of the chaff are blown by the rotor 42 through the outlet 37. The elevated grain may be cleaned of dust and chaff in any suitable way.

From the foregoing, it will be seen that novel provision has been made for attaining the desired ends, but attention is again invited to the possibility of making variations within the scope of the invention as claimed.

I claim:

1. A grain thresher and separator comprising a cylindrical casing having its axis disposed vertically, said casing having a cylindrical side wall, a top, and a bottom, said casing bottom having a straw-inlet-opening spaced inwardly from said casing side wall and also having a grain-outlet-opening between said casing side wall and said straw-inlet-opening; an inner continuous wall surrounding said straw-inlet-opening of said bottom and having a portion of its circumference disposed between this straw-inlet-opening and said grain-outlet-opening of said bottom, said inner wall being spaced inwardly from said casing side wall and extending entirely from said casing bottom to said casing top, thereby providing a grain-receiving chamber between said inner wall and said casing side wall and extending entirely from said casing bottom to said casing top; said inner wall having grain-discharge perforations from its interior to said grain-receiving chamber; said inner wall also having a tangential straw-outlet located at its upper end and extending across said grain-receiving chamber and through said casing side wall; grain-threshing means under said bottom and effective to discharge straw upwardly through said straw-inlet-opening of said bottom into the space within the confines of said inner wall; a rotary straw-whirler-and-blower mounted on a vertical axis in said space within the confines of said inner wall and alone serving to discharge all straw through said tangential straw-outlet of said inner wall, said straw-whirler-and-blower having radial blades in close proximity with said inner wall and extending substantially from said casing bottom to said casing top; a rotary scraper between said inner and outer walls and operable over the portion of said casing bottom forming the bottom of said grain-receiving chamber for scraping the grain discharged into this chamber to said grain-outlet-opening of said casing bottom.

and means for driving said straw-whirler-and-blower and said scraper.

2. A structure as specified in claim 1; said grain-threshing means comprising a cylinder-and-concave-assembly, the cylinder of which is positioned directly under and close to said straw-inlet-opening, and a fixed perforated up-chute extending from the delivery edge of the concave of said assembly, said up-chute extending substantially vertically to said bottom at one edge of said straw-inlet-opening, whereby the straw is directly thrown and guided into said straw-inlet-opening and any straw tending to pass said straw-inlet-opening with said cylinder will be beaten against the edge of this opening opposite said up-chute.

3. A grain thresher and separator comprising a cylindrical casing having its axis disposed vertically, said casing having a cylindrical side wall, a top, and a bottom, said casing bottom having a straw-inlet-opening spaced inwardly from said casing side wall and also having a grain-outlet-opening between said casing side wall and said straw-inlet-opening; an inner continuous wall surrounding said straw-inlet-opening of said bottom and having a portion of its circumference disposed between this straw-inlet-opening and said grain-outlet-opening of said bottom, said inner wall being spaced inwardly from said casing side wall and extending entirely from said casing bottom to said casing top, thereby providing a grain-receiving chamber between said inner wall and said casing side wall and extending entirely from said casing bottom to said casing top, said inner wall having grain-discharge perforations from its interior to said grain-receiving chamber, said inner wall also having a tangential straw-outlet located at its upper end and extending across said grain-receiving chamber and through said casing side wall; a rotary straw-whirler-and-blower mounted on a vertical axis in the space within the confines of said inner wall and alone serving to discharge all straw through said tangential straw-outlet of said inner wall, said straw-whirler-and-blower having radial blades in close proximity with said inner wall and extending substantially from said casing bottom to said casing top; a rotary scraper between said inner and outer walls and operable over the portion of said casing bottom forming the bottom of said grain-receiving chamber for scraping the grain discharged into this chamber to said grain-outlet-opening of said bottom; and means for driving said straw-whirler-and-blower and said scraper.

4. In a grain separator, a continuous-vertical wall having grain-discharge perforations, a top plate closing the upper end of said wall, said wall having a straw-inlet into its lower end and a tangential straw-outlet from its upper end; and a rotor mounted on a vertical axis within the confines of said wall, said rotor having an inverted cone-shaped body, the upper end of said inverted cone-shaped body being disposed at the upper end of said wall and extending radially substantially to the latter, the lower end of said inverted cone-shaped body being disposed at an elevation above the lower end of said wall, said inverted cone-shaped body having circumferentially spaced straw-whirling and air-blowing blades extending radially substantially to said wall and extending vertically to the upper and lower ends of said wall, the portions of the inner edges of said blades below said inverted cone-shaped body being disposed in downwardly diverging relation with each other to prevent interference with admission of the straw through said straw-inlet.

5. In a grain separator, a continuous-vertical wall having a straw-inlet at its lower end and a tangential straw-outlet at its upper end, a top closing the upper end of said wall, and a rotary straw-whirler-and-blower mounted on a vertical axis within the confines of said wall, said wall having a helical internal groove which ascends in the direction of rotation of said straw-whirler-and-blower, said wall also having a relatively narrow helical rib the convolutions of which are disposed between the convolutions of said groove, said wall having grain-discharge perforations from said groove to its outer side, said rib having circumferentially spaced straw-agitating cams, said cams being spirally pitched and being effective to repeatedly move the straw inwardly and then release it for outward movement by centrifugal force, thereby radially pulsating the straw for better release of the grain.

6. A structure as specified in claim 4; said wall being increased gradually in diameter from its lower to its upper end and having a helical internal groove which ascends in the direction of rotation of said rotor, said blades having steeply inclined outer edges spanning said helical groove, said wall having straw-agitating cams between the convolutions of said helical groove and cooperable with said outer edges of said blades, said cams being spirally pitched and being effective to repeatedly move the straw inwardly and then release it for outward movement by centrifugal force, thereby radially pulsating the straw for better release of the grain.

7. In a grain separator, a casing having a vertical side wall, a bottom, and a top, said side wall comprising a lower cylindrical section, an upper cylindrical section of less diameter than said lower section, and a horizontal step connecting said lower and upper sections, said step having an opening, a horizontal gear ring directly under said step and having its teeth exposed at said opening, a driven pinion mounted adjacent said opening and having its lower portion received in said opening and meshed with said teeth, a sleeve secured to and projecting downwardly from said gear ring, means rotatably mounting said gear ring and sleeve in concentric relation with said lower section of said side wall, a continuous inner wall spaced inwardly from said side wall and concentric therewith, said inner wall being perforated to discharge grain into the space between said side wall and said inner wall, said bottom having a grain outlet, and grain-scraping blades secured to and projecting inwardly from said sleeve for scraping grain along said bottom to said outlet.

8. In a grain separator, a continuous vertical wall, a top closing the upper end of said wall, a bottom closing the lower end of said wall and having a straw-inlet, and a rotary straw-whirler-and-blower mounted on a vertical axis within the confines of said wall, said wall being increased gradually in diameter from its lower to its upper end and having a tangential straw outlet at the latter, said wall having a helical internal groove which ascends in the direction of rotation of said straw-whirler-and-blower and terminates at said tangential straw outlet, said wall also having a relatively narrow helical rib the convolutions of which are disposed between the convolutions of said groove, said rib having circumferentially spaced straw-agitating cams, said wall having grain-discharge perforations from said helical groove to its outer side, said cams being spirally pitched and being effective to repeatedly move the straw inwardly and then release it for outward movement by centrifugal force, thereby radially pulsating the straw for better release of the grain.

ROLLIE CRAIN.

REFERENCES CITED

The following references are of record in the file of this patent:

UNITED STATES PATENTS

| Number | Name | Date |
|---|---|---|
| 551,492 | Landis | Dec. 17, 1895 |
| 551,495 | Landis | Dec. 17, 1895 |

FOREIGN PATENTS

| Number | Country | Date |
|---|---|---|
| 14,515 | Great Britain | July 14, 1905 |